US004001583B2

United States Statutory Invention Registration [19]

[11] Reg. Number: H1583

Hwo et al.

[45] Published: Aug. 6, 1996

[54] ELASTOMERIC POLYBUTYLENE POLYMER

[75] Inventors: Charles C. Hwo, Sugar Land; Dale J. Wilpers, Houston, both of Tex.

[73] Assignee: Shell Oil Company, Houston, Tex.

[21] Appl. No.: 70,076

[22] Filed: Jun. 1, 1993

[51] Int. Cl.[6] ..... C08F 10/08

[52] U.S. Cl. ..... 526/348.6; 525/240

[58] Field of Search ..... 525/240

[56] References Cited

U.S. PATENT DOCUMENTS

| | | | |
|---|---|---|---|
| H179 | 12/1986 | Klingensmith et al. | 526/125 |
| 4,298,722 | 11/1981 | Collette et al. | 526/348.6 |
| 4,554,321 | 11/1985 | Hwo et al. | 525/240 |
| 4,713,282 | 12/1987 | Yazaki et al. | 428/216 |
| 4,971,936 | 11/1990 | Wilson | 502/124 |

*Primary Examiner*—Charles T. Jordan
*Assistant Examiner*—Meena Chelliah

[57] ABSTRACT

It is herein disclosed a novel elastomeric polybutylene-1 having and exhibiting syndiotacticity of greater than ten percent, and possessing other desirable properties.

The novel elastomeric polybutylene-1 can be blended with compatible materials such as polypropylene and its copolymers, ethylene-propylene block copolymers, butyl rubbers and polyisobutylene. Such compositions are particularly suitable in films, hot melt adhesives, textile and fiber applications.

The novel elastomeric polybutylene-1 can also be blended with incompatible materials such as ethylenically unsaturated esters (EVA, EMA, EMAA, EEA), polyester, nylon, polystyrene, styrene block copolymers (SEBS, SIS, SBS) and polyethylenes into a composition having soft and improved elastic properties. Such blends are particularly useful in easy-open packaging and foam applications, and in PVC replacement. When oriented, films made of such blends are used as soft and elastic shrink films.

The novel elastomeric polybutylene-1 can also be blended with both incompatible and compatible materials.

6 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ELASTOMERIC POLYBUTYLENE POLYMER

FIELD OF THE INVENTION

This invention generally relates to novel polymers of 1-butene. More particularly, this invention relates to elastomeric polybutylene-1 polymers.

BACKGROUND OF THE INVENTION

Thermoplastic, predominantly isotactic homo- and copolymers of 1-butene, commonly referred to as poly-1-butene or polybutylene (conventional polybutene-1) are known in the art. Elastomeric polymers including elastomeric polybutylene-1 are also known in the art. In certain applications, there has been an effort to replace conventional polybutylene-1 with elastomeric polybutylene-1. These applications include film sheets and packaging film where the elastic nature of the elastomeric polybutylene-1 is preferred.

Packaging films are required to have certain characteristics which are desirable for the particular application. For example, films which are used for wrapping food such as vegetables, meat or fish, are minimally required to have a good puncture resistance and a good elastic recovery, sometimes also referred to as memory. A good puncture resistance is particularly important when packaging meat with bones because of the greater likelihood of the bones puncturing the film. Good recovery properties are particularly important in packaging food. Usually, the food is sold in service or convenience stores, or in grocery stores where many customers touch the packages. These touchings deform the film, and without the ability to sufficiently recover, the packaged food looks unfresh and often cannot be sold anymore.

SUMMARY OF THE INVENTION

It is an object of the invention to provide an elastomeric polybutylene-1 having significantly improved properties.

It is a further object of the invention to provide an elastomeric polybutylene-1 having a significant amount of syndiotacticity.

Accordingly, it is now provided an elastomeric polybutylene-1 having and exhibiting syndiotacticity of greater than ten (10) percent.

The inventive elastomeric polybutylene-1 can be blended with compatible materials such as polypropylene and its copolymers, ethylene-propylene block copolymers, butyl rubbers, and polyisobutylene into a composition having soft and improved elastic properties. Such compositions are particularly suitable in films, hot melt adhesives, textile and fiber applications.

The novel elastomeric polybutylene-1 can also be blended with incompatible materials such as ethylenically unsaturated esters (EVA, EMA, EMAA, EEA), polyester, nylon, polystyrene, styrene block copolymers (SEBS, SIS, SBS) and polyethylenes. Such blends are particularly useful in easy-open packaging and foam applications and in PVC replacement. When oriented, films made of such blends are used as soft and elastic shrink films.

The novel elastomeric polybutylene-1 can also be blended with both incompatible and compatible materials wherein such materials are as previously disclosed.

The inventive elastomeric polybutylene-1 composition also has utility in automotive and hot melt adhesive applications, and in the manufacturing of disposable products.

DETAILED DESCRIPTION OF THE INVENTION

Polybutylene polymers are well known in the art. These polymers can be homopolymers or copolymers. The homopolymers of polybutylene can be further classified into isotactic, atactic, or syndiotactic. Conventional polybutylene is predominantly isotactic and has a high degree of crystallinity. Prominently useful properties of conventional isotactic polybutylene include toughness, resistance to creep, and resistance to environmental stress cracking. These properties enable conventional isotactic polybutylene to be useful in applications such as pipe or tubing, films, and polymer modifications.

Another type of polybutylene known in the art is elastomeric polybutylene. Elastomeric polybutylene, like conventional polybutylene, is highly stereoregular. However, unlike conventional polybutylene, it has a lesser degree of crystallinity, and exhibits physical properties which more closely parallel those of thermoplastic elastomers such as commercial block copolymers based on styrene and diolefins or complex blends of polypropylene with elastomeric copolymers of ethylene and propylene.

A prominent feature of elastomeric polybutylene is its substantially suppressed level of crystallinity compared to conventional polybutylenes. A companion feature of the elastomeric polybutylene, one which makes it unique among the large number of polyolefins produced with stereoselective catalyst, is the fact that this suppression of crystallinity is achieved without a corresponding large increase in amount of easily extractable polymer (soluble in refluxing diethyl ether). This unusually low ether solubles content makes possible film use for medical and food packages that cannot tolerate substantial leaching of the plastic into the solutions or food.

Another distinguishing feature of the novel elastomeric polybutylene is its $^{13}C$ NMR spectrum. The $^{13}C$ NMR method provides detailed information about the configuration and conformation of short sections of polymer chains. A comparison of the $^{13}C$ NMR spectra of conventional polybutylene with that of the novel elastomeric polybutylene indicates a significant difference between the polymers, even though they both have a very high degree of steric order. The difference shows up in the elastomeric polybutylene as a higher proportion of polymer which comprises of short sequences of frequent tactic inversion alternating with longer isotactic sequences. This indicates a molecular structure of relatively short average isotactic sequences, which contrasts strikingly with the structure of long average isotactic sequences of conventional polybutylene. The elastomeric polybutylene consists mainly of isotactic blocks, interrupted by inversions of only one or a few monomer units largely in alternating (syndiotactic) stereochemical configurations.

Elastomeric polybutylene having a wide range of molecular weights may be produced. Number average molecular weights (Mn) may be from 20,000 to 300,000 and weight average molecular weights (Mw) from 150,000 to 2,200,000. A characteristic of the novel elastomeric polybutylene of this invention is a narrow molecular weight distribution, as indicated by the ratio of Mw/Mn (Q-value) which is typically in the order of 70 to 75% wt or less than the Q-value of conventional polybutylene.

Both conventional and elastomeric isotactic polybutylene are unique compared to other commercial polyolefins in that they are capable of existing in several crystalline modifications which can be isolated in almost pure form. Conventional isotactic polybutylene typically first solidifies from the melt in the crystal form known as Type II. Type II is unstable with respect to Type I and converts to Type I at a rate depending on a variety of factors, such as molecular weight, tacticity, temperature, pressure, and mechanical shock. Properties of the several crystal forms of conventional isotactic polybutylene are well known. The transformation of Type II to Type I has a marked effect on the physical properties. For example, density, rigidity and strength are increased.

Unlike conventional polybutylenes, our unique elastomeric polybutylene crystallizes from melt in the form of crystal Type II, which is not distinctly transformed to crystal Type I over a period of hours or days. The physical properties of this type of elastomeric polybutylene (ELPB) made with SHAC™ 201 catalyst is significantly different from the polymer made from the conventional isotactic polybutylene (I-PB) with titanium trichloride ($TICl_3$) as catalyst and the short stereoblock polybutylene (SSPB) made with a SHAC™ 103 catalyst.

The novel elastomeric polybutylene can also be made with the catalyst system disclosed in U.S. Pat. No. 4,971,936. The catalyst comprises the reaction of a magnesium alkoxide and a tetravalent titanium halide wherein the reaction takes place in the presence of an electron donor which is selected from the group consisting of 3-methyl-veratrole, 3-methoxy-veratrole, 4-nitro-veratrole and 4-methoxy-veratrole.

Table 1 lists the general physical properties of the elastomeric polybutylene (ELPB) of this invention. Also shown in Table 1, for comparison, are corresponding properties of a butene-1 homopolymer (I-PB) produced on a commercial scale in a solution process with TIC13 as catalyst and those of butene-1 homopolymer (SSPB) with a SHAC™ 103 catalyst.

TABLE 1

COMPARISON OF ELPB, SSPB, AND I-PB

| PROPERTY | ELPB | SSPB* | I-PB |
|---|---|---|---|
| Catalyst | SHAC 201 | SHAC 103 | $TiCl_3$ |
| % Isotacticity | <70 | 71–80 | >80 |
| Liso | <20 | <25 | >85 |
| % Syndiotacticity** | >10 | 5–10 | <5 |
| Melting Point, °C. | | | |
| 1st Heat | <105 | 100–118 | >120 |
| 2nd Heat | <101 | 98–110 | >110 |
| % Crystallinity | <25 | 25–40 | >40 |
| Tensile Strength @ Break psi | <3,000 | 3,000–4,500 | >4,500 |
| Elongation at Break, % | >500 | 300–600 | <400 |
| Yield Strength, psi | No Yield Point | 400–1,700 | >1,700 |
| Tensile Set, % | <170 | 150–200 | >200 |

*Data mostly from the U.S. Statutory Invention Registration No. H179.

As shown in Table, 1, the elastomeric polybutylene is very distinctly different from the other type polybutylenes in basic molecular configuration in such properties as tacticity, and isotactic block length (Liso). They are also different in physical properties such as melting points, percent (%) crystallinity, tensile break strength, elongation, tensile yield strength and percent (%) tensile set. The no tensile yield point and low tensile set of the elastomeric polybutylene is particularly suitable in applications pertaining to the replacement of PVC film as film wrap and in the manufacture of fibers where high resiliency is required.

The invention is further described by the following non-limiting examples and data tables.

EXAMPLE 1

Butene polymerizations were conducted in a one gallon stainless steel autoclave utilizing 1.7 liters of butene-1 monomer. The magnesium alkoxide compound of the formula:

$$Mg_4(OCH_3)_6(CH_3OH)_{10}(1,3\text{-}0,OH\text{-}C_6H_4)_2, M$$

(wherein $(1,3\text{-}O,OH\text{-}C_6H_4)_2$, M is a resorcinate) was used to prepare the procatalyst. The magnesium alkoxide compound was prepared by the dropwise addition of tetraethoxysilane stabilized 12% magnesium methoxide solution to a solution of resorcinol in methanol. Partial azeotropic desolvation was carried out by slurrying 40 grams of M in 300 grams of cyclohexane containing 120 grams of tetraethoxysilane and boiling the mixture until a decrease of 20 to 30% in solvent volume had occurred.

The procatalyst was prepared by stirring 7.8 grams of dissolved M with 12 mmoles of 4-methoxyveratrole in 200 ml of a 50-50 titanium tetrachloride-chlorobenzene solution for one hour at 115° C. followed by two washes at 115° C. with fresh 200 ml portions of that solvent mixture, then a quick rinse (less than 10 minutes) with 100 ml of fresh titanium tetrachloridechlorobenzene solvent mixture. Excess titanium was removed by thorough isopentane rinsing and the catalyst was dried under moving nitrogen at 40° C. Ti content was 3.55%. A portion of the dry procatalyst powder was then made into a 5% slurry in mineral oil.

In the following polymerizations, triethyl aluminum was used as a 0.28 molar in isooctane. Tiisobutyl aluminum was used as a 0.87 molar solution in heptane. Diethylaluminum chloride was used as a 1.5 molar solution in heptane.

The polymerization was carried out by mixing 0.015 to 0.003 mmol of procatalyst, aluminum alkyl, and selectivity control agent (SCA) then, after 20 minutes, injecting the mixture into 1.8 liters of liquid butene-1 in the one gallon stainless autoclave. At the end of 90 minutes the reactions were terminated by injecting 600 ml of isopropyl alcohol to the cooled reactor prior to venting the unreacted monomer. Additional details regarding the catalysts utilized is summarized in Tables IIA and IIB.

TABLE IIA

Catalysts With Substituted Veratrole As Electron Donors Internal (SCA)

| Catalyst | Electron Donor | | Mg | Ti |
|---|---|---|---|---|
| # | Name | Mmol | % Wt | % Wt |
| 1 | Vera | 8.6 | 20.2 | 3.01 |
| 2 | 30 MV | 10 | 17.9 | 5.78 |
| 3 | 40 MV | 12 | 18.8 | 3.55 |

Note:
Vera = Veratrole
30 MV = 3 Methoxyveratrole
40 MV = 4 Methoxyveratrole

TABLE IIB

Autoclave Runs to Produce ELPB With Veratrole-Based Catalysts (1.8 liters butene-1, 0.01–0.02 mol Ti, 60° C., 90 min.)

| Run # | Cat. # | SCA | SCA/Ti mol/mol | TEA/Ti mol/mol | Yield Kg/g cat. |
|---|---|---|---|---|---|
| 1 | 1 | CYANCL | 4 | 105 | 8.0 |
| 2 | 2 | DIBDMS | 5 | 107 | 4.2 |
| 3 | 3 | None | — | 70 | 7.0 |

NOTE:
CYANCL = Cyanuric Chloride
DIBDMS = Diisobutyl dimethoxysilane
TEA = Titanium
SCA = Selectivity Control Agent The tensile data and NMR results are shown in Tables IIC and IID, respectively.

TABLE IIC

Tensile Data of the ELPB Produced

| Run # | Tbreak psi | Tset % | Tyield psi | Elong. % |
|---|---|---|---|---|
| 1 | 2751 | 162 | No | 485 |
| 2 | 1932 | 166 | Yield | 346 |
| 3A | 1609 | 110 | Point | 557 |
| 3B | | 100 | | 600 |

TABLE IID

NMR Result of the ELPB Produced

| Run # | ISO % | Liso Units | Syn % |
|---|---|---|---|
| 1 | 68 | 17 | 13 |
| 2 | 64 | 16 | 14 |
| 3 | 60 | 10 | 16 |

The low tensile set values and no yield point of the novel elastomeric polybutylene makes it suitable in film applications which requires good recovery upon stretch and in fiber applications which requires good recovery upon compression.

EXAMPLE 2

The ELPB product from run #3 in Example 1 was further characterized based on its physical properties. These properties are summarized in Table IIIA.

TABLE IIIA

Physical Properties of ELPB Product from Run #3, Example 1

| | |
|---|---|
| % Isotacticity | 60 |
| Liso, Units | 10 |
| % Syndiotacticity | 16 |
| Melting Point, °C. | |
| 1st Heat | 101.5 |
| 2nd Heat | 100.3 |
| % Crystallinity | 20 |
| Tensile Strength at Break, psi | 1609 |
| Elongation at Break, % | 557 |
| | 660 |
| Yield Strength | No Yield Point |
| Tensile Set, % | 110 |
| | 120 |

The ELPB because of its low tensile set and no tensile yield point is very suitable for the manufacture of wrapping films for fresh meat and produce and in fibers for carpets.

While this invention has been described in detail for the purpose of illustration, it is not to be construed as limited thereby but is intended to cover all changes and modifications within the spirit and scope thereof.

What is claimed is:

1. A polymer composition consisting essentially of elastomeric polybutylene-1 (ELPB) wherein said elastomeric polybutene-1 has and exhibits syndiotacticity of greater than ten percent.

2. A composition as in claim 1 wherein said ELPB is further characterized by the following properties:

% Isotacticity: less than 70

Isotactic Block Length: less than 20 units

Melting points, °C.: 1st heat: <105; 2nd heat: 101

Tensile Strength at Break, psi: <3,000

Tensile Yield Strength<psi: No yield point

Tensile Set, %: <170.

3. An article of manufacture made from the composition of claim 1.

4. An article of manufacture made from the composition of claim 2.

5. A polymer blend consisting essentially of:

(i) an elastomeric polybutene-1 (ELPB), and (ii) a material selected from a group consisting of polypropylene hompolymer; polypropylene copolymer; ethylene-propylene block copolymer; butyl rubber; polyisobutylene; a polymer of ethylenically unsaturated ester(s) selected from the group consisting of EVA, EMA, EMAA, EEA and mixture thereof; polyester; nylon; polystyrene; styrene block copolymer(s) selected from the group consisting of SEBS, SIS, SBS and a mixture thereof; polyethylene; and a mixture thereof and a mixture thereof;

wherein said elastomeric polybutene-1 (ELPB) has and exhibits syndiotacticity of greater than ten percent, wherein said ELPB is characterized by the following properties:

% Isotacticity: less than 70

Isotactic Block Length: less than 20 units

Crystallinity: <25

Melting points, °C.: 1st heat: <105; 2nd heat:<101

Tensile Strength at Break, psi: <3,000

Tensile Yield Strength, psi: No yield point

Tensile Set, %: <170.

6. A polymer blend consisting essentially of:

(i) an elastomeric polybutene-1 (ELPB);

(ii) a material selected from a group consisting of polypropylene hompolymer, polypropylene copolymer, ethylene-propylene block copolymer, butyl rubber, polyisobutylene, and a mixture thereof; and (iii) a material selected from a group consisting of polymer of ethylenically unsaturated ester(s) selected from the group consisting of EVA, EMA, EMAA, EEA and a mixture thereof;-polyester; nylon; polystyrene; styrene block copolymer(s) selected from the group consisting of SEBS, SIS, SBS and mixture thereof; polyethylene; and a mixture thereof;

wherein said elastomeric polybutene-1 has and exhibits syndiotacticity of greater than ten percent, wherein said ELPB is characterized by the following properties:

% Isotacticity: less than 70

Isotactic Block Length: less than 20 units

Crystall inity: <25%

Melting points, °C.: 1st heat: <105; 2nd heat:<101

Tensile Strength at Break, psi: <3,000

Tensile Yield Strength, psi: No yield point

Tensile Set, %: <170.

* * * * *